(12) United States Patent
Kurien et al.

(10) Patent No.: US 8,347,085 B2
(45) Date of Patent: *Jan. 1, 2013

(54) INTEGRATING SECURITY PROTECTION TOOLS WITH COMPUTER DEVICE INTEGRITY AND PRIVACY POLICY

(75) Inventors: Thekkthalackal Varugis Kurien, Sammamish, WA (US); Jeffrey B Hamblin, Issaquah, WA (US); Narasimha Rao Nagampalli, Kirkland, WA (US); Peter T Brundrett, Seattle, WA (US); Scott Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,855

(22) Filed: Dec. 30, 2011

(65) Prior Publication Data
US 2012/0102577 A1   Apr. 26, 2012

Related U.S. Application Data

(63) Continuation of application No. 11/472,052, filed on Jun. 20, 2006, now Pat. No. 8,117,441.

(51) Int. Cl.
H04L 29/06 (2006.01)

(52) U.S. Cl. ........ 713/164; 713/150; 713/165; 713/166; 713/167; 726/26; 726/27; 726/30

(58) Field of Classification Search .................. None
See application file for complete search history.

(56) References Cited

U.S. PATENT DOCUMENTS

| | | | |
|---|---|---|---|
| 6,480,962 B1 * | 11/2002 | Touboul | 726/22 |
| 6,678,639 B2 * | 1/2004 | Little et al. | 702/188 |
| 6,934,857 B1 * | 8/2005 | Bartleson et al. | 726/5 |
| 7,065,783 B2 | 6/2006 | Rygaard | |
| 7,099,663 B2 * | 8/2006 | Lundblade et al. | 455/425 |
| 7,480,655 B2 * | 1/2009 | Thomas et al. | 1/1 |
| 7,607,174 B1 * | 10/2009 | Kashchenko et al. | 726/25 |
| 7,647,633 B2 * | 1/2010 | Edery et al. | 726/22 |
| 7,904,956 B2 * | 3/2011 | Golan et al. | 726/22 |
| 7,962,918 B2 * | 6/2011 | Schaefer et al. | 719/313 |
| 8,020,141 B2 * | 9/2011 | Hunt et al. | 717/106 |
| 8,060,924 B2 * | 11/2011 | Usov | 726/10 |
| 8,117,441 B2 * | 2/2012 | Kurien et al. | 713/164 |
| 8,117,659 B2 * | 2/2012 | Hartrell et al. | 726/24 |
| 8,122,361 B2 * | 2/2012 | Avraham et al. | 715/741 |
| 8,136,153 B2 * | 3/2012 | Zhang et al. | 726/17 |
| 8,205,257 B1 * | 6/2012 | Satish et al. | 726/22 |
| 2005/0086509 A1 | 4/2005 | Ranganathan | |
| 2005/0182969 A1 * | 8/2005 | Ginter et al. | 713/201 |
| 2005/0223239 A1 * | 10/2005 | Dotan | 713/188 |

(Continued)

*Primary Examiner* — Syed A. Zia
(74) *Attorney, Agent, or Firm* — L. Alan Collins; Collins & Collins Intellectual, LLC (57) ABSTRACT

At computer device power on, the operating system of the computer device initiates a monitor. The monitor assigns a monitoring program to each program and object (collectively, "program") running on the computer device to monitor the activities of the program. When the monitoring program is assigned to a program, the monitoring program is assigned an integrity and/or privacy label (collectively, "integrity label") based on predetermined criteria applied to the monitored program. The monitoring program, in turn, assigns an integrity label to the program monitored by the monitoring program. The integrity label assigned to the monitored program is less than or equal to the integrity label of the monitoring program. The monitor enforces an integrity policy of the computer device based on the integrity label assigned to monitored programs and the integrity label associated with data, another program, or a remote network resource that the monitored program is seeking to access.

20 Claims, 4 Drawing Sheets

U.S. PATENT DOCUMENTS

| | | |
|---|---|---|
| 2006/0005019 A1 | 1/2006 | Chao |
| 2007/0050777 A1* | 3/2007 | Hutchinson et al. .......... 718/104 |
| 2007/0101435 A1* | 5/2007 | Konanka et al. ................ 726/27 |
| 2007/0192830 A1* | 8/2007 | O'Connor ......................... 726/2 |
| 2008/0127292 A1 | 5/2008 | Cooper et al. |
| 2008/0136605 A1* | 6/2008 | Hunt et al. ............... 340/286.02 |
| 2009/0077664 A1 | 3/2009 | Hsu |
| 2010/0037067 A1 | 2/2010 | Rangadass et al. |

* cited by examiner

INTEGRATING SECURITY PROTECTION TOOLS WITH COMPUTER DEVICE INTEGRITY AND PRIVACY POLICY

RELATED APPLICATION(S)

This application claims priority from and is a continuation of U.S. patent application Ser. No. 11/472,052 that was filed on Jun. 20, 2006, and that is incorporated herein by reference in its entirety.

BACKGROUND

During use of the Internet, malware, spyware, and virus programs (hereinafter "MSV programs") are often downloaded to computing devices, usually without a computing device user's knowledge. Computing devices include, but are not limited to desktop and laptop personal computers, personal digital assistants (PDAs), cellular telephones, etc. Computing devices are generically referred to hereinafter as "computer devices." In order to safeguard the kernel, applications, user data, other programs, objects, etc., on a computer device from the malicious activities of MSV programs, a computer device user usually installs a commercially available, third party security protection product (hereinafter "SPT"). SPTs, for example Norton AntiVirus™ from Symantec™, Ad-aware® from Lavasoft AB, etc., are programs that monitor the activities of installed programs executing and objects (files and registry keys) running on the computer device, classify the programs and objects into "known good" or "known/suspected malicious" on the basis of a signature, and attempt to confine those programs that are malicious and objects that are infected by the malicious programs The problem with the monitoring, classifying, and confining the programs by the SPTs mentioned above is that the level of confinement that the SPTs can achieve is relatively limited as compared to the level of confinement that the system security reference monitor can enforce.

Current SPTs monitor the activities of programs executing and objects running on a computer device, usually from the time the computer device is powered on. Every program and object is classified by the SPT into "known good" or "known/suspected malicious" according to a match between the program image and a signature file for the SPT. Current SPTs confine the program based on a signature in the signature file. Confinement of a program (or confinement of an object infected by a malicious program) can result in the program (or object) being quarantined, deleted, or un-installed by the SPTs. In some instances, current SPTs display a dialog box notifying the computer device user of the malicious program and the objects infected by the malicious program. Based on this information, the computer device user can decide to allow the program to execute, and/or allow the infected object to remain, or to quarantine, delete, or uninstall the program and/or infected object from the computer device.

Figure 1:
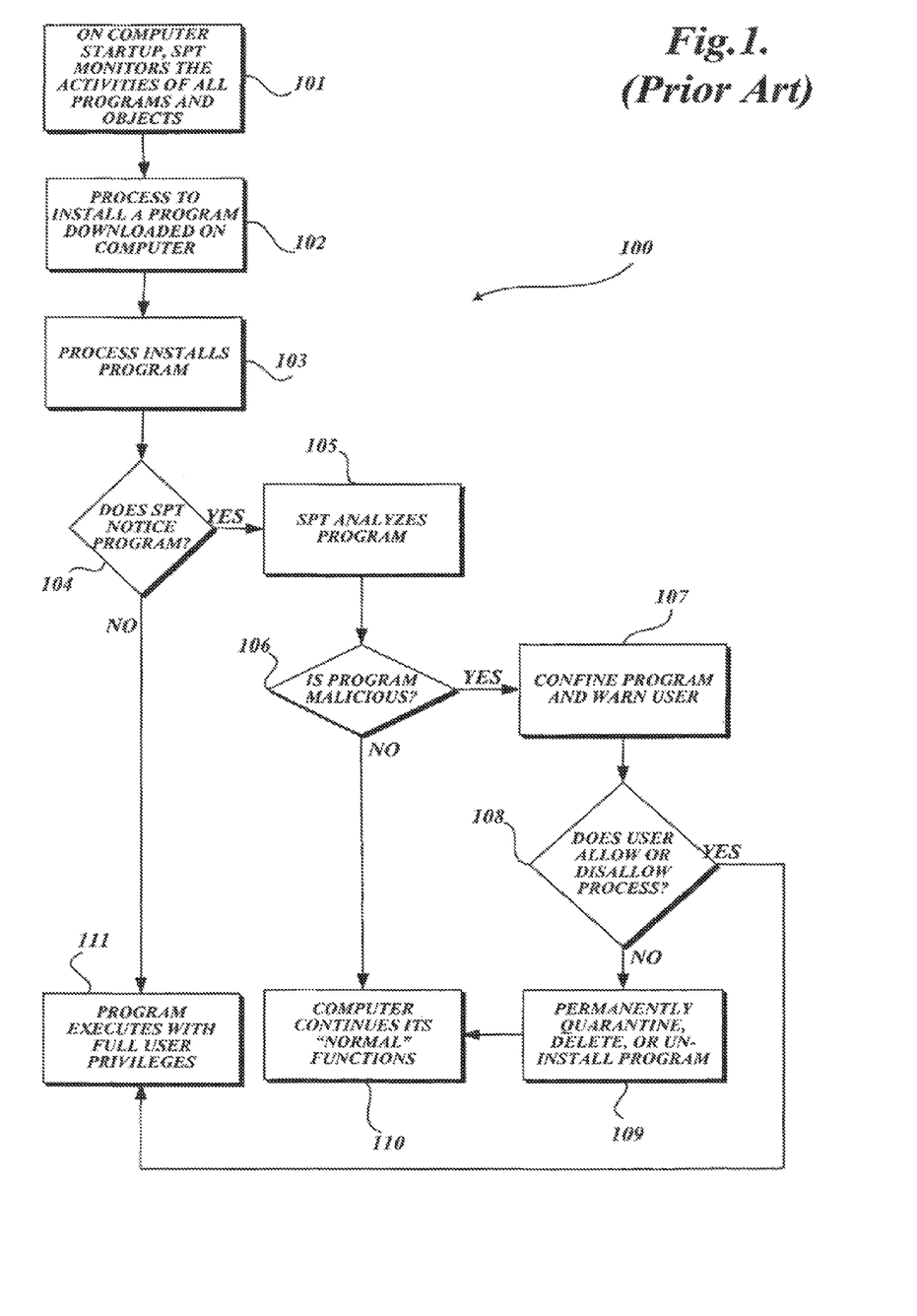
FIG. 1 is a functional flowchart illustrating exemplary actions that occur when a user of a prior art computer device downloads a process to install a program.

FIG. 1 is a functional flowchart illustrating exemplary actions 100 that occur when a user of a prior art computer device downloads a process to install a program. At block 101, on computer device start up, an SPT monitors the activity of all programs executing and objects running on the computer device. At block 102, the computer device user accesses the Internet and a process to install a program is downloaded to the computer device. The process is either knowingly downloaded by the computer device user, or unknowingly downloaded without the computer device user's permission. At block 103, the process installs the program. At block 104, if the SPT notices the newly installed program, at block 105 the SPT analyzes the program in order to assign the program a "known good" or "known/suspected malicious" classification (the "YES" branch from block 104). Analysis of the program may include the verification of the code origin of the program and/or the contents of a signature file of the program.

At block 106, the SPT checks to determine if the newly installed program is a malicious program (for example, an MSV program). If the newly installed program is a malicious program (the "YES" branch from block 106), at block 107 the SPT executes a mandatory (SPT specific) policy that confines the newly installed program, and warns the computer device user of the malicious program. It should be noted here that the security policy of the SPT is independent of the computer device security policy enforced by a mandatory security model integrated into an Operating System Reference Monitor (hereinafter "SRM"). At block 107, after the computer device user is warned of the malicious program, at block 108 the computer device user either allows or disallows the malicious program to execute. If the computer device user disallows (the "NO" branch from block 108) the newly installed program to execute (maybe because the computer device user unknowingly downloaded the process), at block 109 the confined program is permanently quarantined, deleted, or uninstalled by the SPT from the computer device. Next, at block 110 the computer device continues its "normal" functions.

If at block 104 the SPT does not notice the newly installed program, or at block 108 the computer device user allows the malicious program to execute, at block 111, the malicious program will execute with all the rights of the computer device user. If the computer device user is an "administrator," the malicious program can execute any "administrator" level computer device task authorized by the operating system. This could potentially compromise the security of the computer device, especially if the malicious program manipulates data or programs that protect the integrity and/or privacy of the computer device.

Computer device users sometimes knowingly let a spyware program execute on their computer device in order to derive certain utility from the spyware program. For example, a computer device user interested in sharing multimedia files over the Internet with other computer device users may download a program to install a multimedia file sharing engine and jukebox along with a list of computer device users having the same interest from an Internet website like www.kazaa.com (hereinafter "Kazaa"). After the spyware program is executed, the spyware program cannot be confined by current SPTs as the spyware program's security privilege is the full privilege of the computer device user. In the example of the computer device user interested in sharing multimedia files over the Internet, once the program is executed, the computer device user can download a multimedia file from a computer device of another computer device user on the list. Similarly, other computer device users can download multimedia files from the computer device user's computer device. This could potentially compromise the security of the computer device user's computer device, especially if some other computer device user installs a virus program while downloading the multimedia file in order to manipulate data or programs protecting the integrity and/or privacy of the computer device user's computer device. Also, since the SPT can only monitor a limited set of programs and objects like files and registry keys running on the computer device, a program like the one from Kazaa discussed above running with the full security privileges of the computer device user may attempt to use other device objects to break out of the confinement the SPT seeks to impose. The SRM, on the other hand, is capable of fully enforcing computer device security policies on a wide range of objects, including those that current SPTs are not aware of. It is also important to note that in the case of spyware programs, the privacy of a computer device is equally important as the integrity of the computer device. Since a computer device user is concerned about programs accessing user confidential data, once a decision has been made to let a program (such as the one from Kazaa) execute, current SPTs can no longer restrict access to user confidential data since the program executes with complete rights and privileges of the computer device user.

As mentioned above, even though current operating systems implement a mandatory security model integrated into the SRM (for example the Mandatory Integrity Control in the Windows Operating System and the Linux Security Modules in the Linux Operating System), unfortunately, such mandatory security models do not implement the classification methods implemented by current SPTs. Consequently, the mandatory access control functionality on such a computer device is hardly ever used. On the other hand, current SPTs have a policy model that is not integrated into the computer device policy model, and thus, current SPTs do not provide the same level of isolation of malicious programs and objects infected by the malicious programs as the SRM. Consequently, it is desirable for the SRM to enforce security policy and to restrict current SPTs to provide the SRM with policy data that will help the SRM make a confinement decision. Once a decision is made to confine a malicious program or objects infected by the malicious program, the SRM is capable of providing a much higher level of enforcement than an SPT is normally capable of providing. By allowing the SRM enforce the security policy of the computer device, current SPTs are de-privileged. Further, the security damage that a compromised SPT can do to the computer device is restricted. Allowing the SRM enforce the security policy of the computer device is in contrast to current SPTs that install device drivers in order to confine malicious programs, and where a compromise in the SPTs result in a complete compromise of the trusted computing base (hereinafter "TCB").

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

An integrity and/or privacy policy for improving the integrity and/or privacy of a computer device is disclosed. According to one exemplary embodiment, current SPTs (hereinafter "SPP programs") monitor and assign an integrity and/or privacy label to every program executing and object running on the computer device. According to another embodiment, the SRM enforces the integrity and/or privacy policy of the computer device on the programs and objects. Since the SRM enforces the integrity and/or privacy policy of the computer device, the SPP programs are de-privileged from enforcing the security policies of the SPP programs. According to another embodiment, the computer device may have more than one SPP program installed. In the exemplary case of the mandatory integrity model of the Windows operating system, the integrity and/or privacy label is a positive integer. Preferably, an SPP program is assigned an integrity and/or privacy label by the computer device security policy within the SRM when the SPP program is installed on the computer device. Thereafter, the SPP program (or more than one SPP program) assigns an integrity and/or privacy label to every program running and object executing on the computer device. The value of the integrity and/or privacy label of the program or object is less than or equal to the value of the SPP program's integrity and/or privacy label. In the case when there are more than one SPP programs, the value of the integrity and/or privacy label of the program or object is less than or equal to the value of the integrity and/or privacy label derived from a voting scheme amongst the SPP programs. In almost all cases, the assigned integrity and/or privacy label is less than the integrity and/or privacy label of the SPP program (in case there is one SPP program), or less than the integrity and/or privacy label derived from the voting scheme (in case there are more than one SPP programs). The integrity and/or privacy label of the program is less than the integrity and/or privacy label of the SPP program since it is not desirable for the program being labeled to over-write the data of the SPP program. The SPP program could assign the integrity and/or privacy label based on an internal policy of the computer device. For example, the assignment could be based on the Internet Zone from which the program originated, malware signatures, or public authentication key of the author of the program author, etc. In the case where the SPP program is assigning a privacy label, for example, an SPP program seeking to confine a spyware program, the SPP program would assign a privacy label lower than the "User Data" privacy label for the spyware program. In this case, the program may still be able to execute, but could not access user credentials or data. Further, preferably, the SPP program uses TCB data to make policy decisions for the program or object the SPP program is assigned to monitor. Furthermore, preferably, the integrity and/or privacy label of the SPP program and the corresponding integrity and/or privacy label of the program and object are maintained in a table located in a secure section of the operating system.

According to another exemplary embodiment, the SRM is initiated by the operating system at computer device power on to enforce the integrity and/or privacy policy of the computer device on all programs executing and objects running on the computer device. Preferably, the SRM is capable of receiving from the SPP program policy labeling decisions associated with the program and object assigned to the SPP program. Also, preferably, the SRM enforces the integrity and/or privacy policy of the computer device based on the policy labeling decisions supplied by the SPP program.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The following description includes numerous specific details intended to provide a thorough description of the exemplary embodiments of the disclosed subject matter. It will be apparent, however, to one skilled in the art that the disclosed subject matter may be practiced without these specific details. In other instances, well known features have not been described in detail so as not to obscure the disclosed subject matter.

When a computer device is powered on, an SRM (or a functionally similar monitor) is initiated by the operating system of the computer device to enforce an integrity and/or privacy policy of the computer device on all programs executing and objects running on the computer device. In general, in one exemplary operating system employing an embodiment of the disclosed subject matter, the SRM enforces the integrity and/or privacy policy of the computer device by comparing an integrity and/or privacy label assigned to a program to an integrity and/or privacy label assigned to an object that the program is trying to manipulate. Isolation of malicious programs or objects infected by malicious programs is performed by the mandatory security model integrated in the SRM (and in some cases by the object managers of the operating system). Further, even if the security policy of the SPP program is independent of the security policy of the computer device enforced by the mandatory security model integrated into an SRM, the SRM enforces the integrity and/or privacy policy of the computer device on all programs executing and objects running on the computer device.

Figure 2:
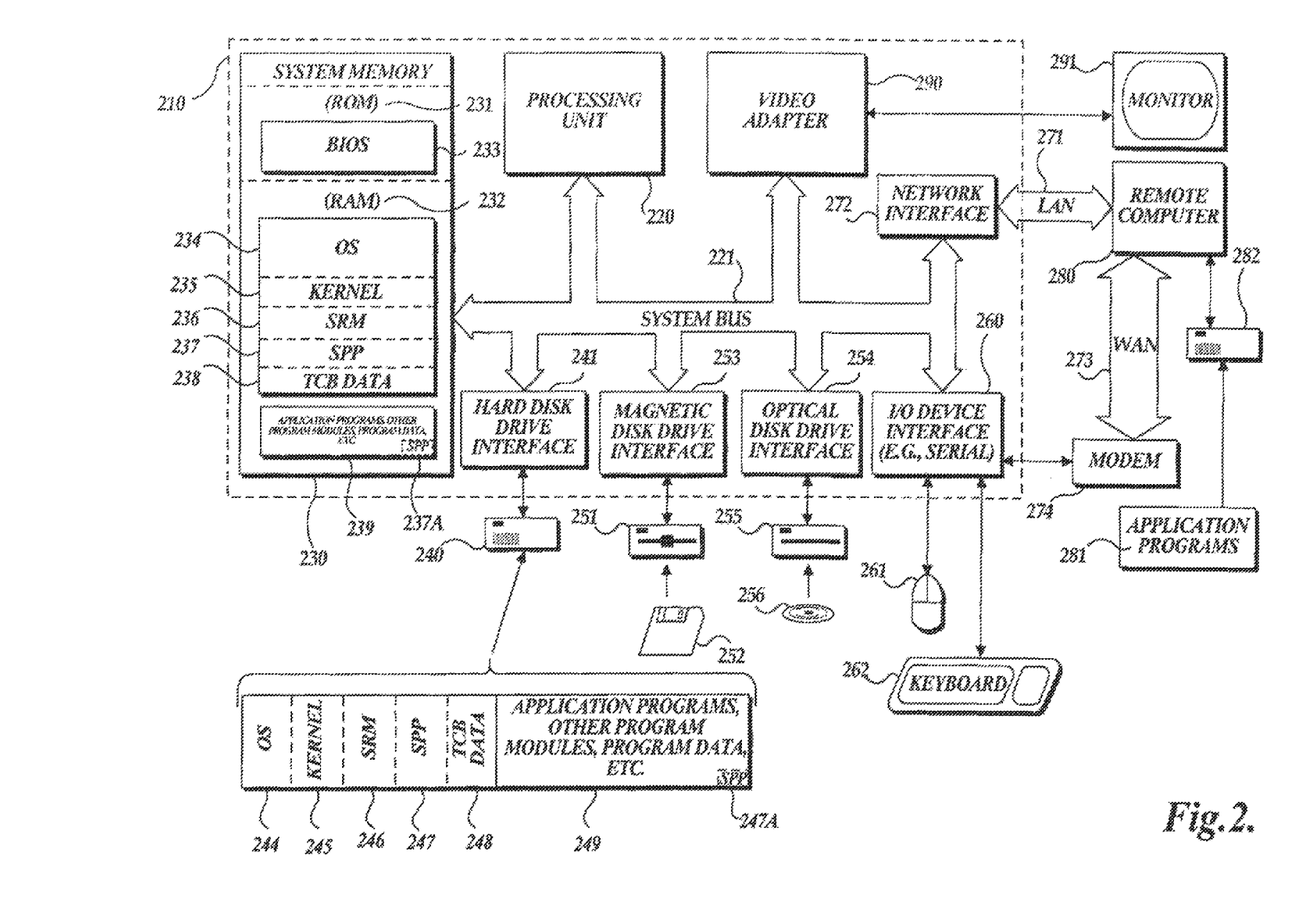
FIG. 2 is a block diagram of a computer device environment suitable for implementing one or more aspects of the disclosed subject matter.

FIG. 2 illustrates an example of a suitable computing system environment suitable for implementing an embodiment of the disclosed subject matter. The computing system environment is only one example of a suitable computing environment and is not intended to suggest any limitation as to the scope of use or functionality of the disclosed subject matter. Neither should the computing environment be interpreted as having any dependency or requirement relating to any one or combination of components illustrated in the exemplary operating environment.

The disclosed subject matter is operational with numerous other general purpose or special purpose computing system environments or configurations. Examples of well known computing systems, environments, and/or configurations in which various embodiments of the disclosed subject matter may find use include various types of computer devices and computer systems, including but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the disclosed subject matter may be described in the general context of computer-executable instructions, such as program modules, being executed by a computer device or system. Generally, program modules include routines, programs, objects, components, data structures, etc., that perform particular tasks or implement particular abstract data types. Embodiments of the disclosed subject matter may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing an embodiment of the disclosed subject matter includes a general purpose computing device in the form of a computer 210, such as a personal computer, laptop computer, server, etc. Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

As is typical, the exemplary computer 210 includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by the computer 210.

Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. The RAM 232 typically contains data and/or program modules that are immediately accessible to and/or presently being operated on by the processing unit 220. By way of example, and not limitation, FIG. 2 illustrates the operating system 234 of the computer including the kernel 235, the SRM 236, one or more SPP programs 237, and TCB data 238. The TCB data 238 contains the location of the SPP programs 237 generated by the SRM 236.

The RAM 232 also contains application programs, other program modules, and program data 239 that may include one or more SPP programs 237a.

The computer 210 may also include removable/non-removable, volatile/non-volatile computer storage media. By way of example only, FIG. 2 illustrates a hard disk drive 240 that reads from or writes to non-removable, non-volatile magnetic media, a magnetic drive 251 that reads from or writes to a removable, non-volatile magnetic disk 252, and an optical disk drive 255 that reads from or writes to a removable, non-volatile optical disk 256, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 240, magnetic disk drive 251, and optical disk drive 255 may be connected to the system bus 221 by a hard disk drive interface 241, a magnetic disk drive interface 253, and an optical drive interface 255, respectively. Alternatively, the hard disk drive 240, magnetic disk drive 251, and optical disk drive 255 are typically connected to the system bus 221 by a Small Computer System Interface (SCSI).

The drives and their associated computer storage media discussed above and illustrated in FIG. 2, provide storage of computer readable instructions, data structures, program modules, and other data for the computer 210. In FIG. 2, for example, the hard disk drive 240 is illustrated as storing the operating system of the computer 244, including the kernel 245, the SRM 246, one or more SPP programs 247, and the TCB data 248, plus application programs, other program modules, and program data 249 that may include one or more SPP programs 247a. The TCB data 248 contains the location of the SPP programs 247a. Note that these components, i.e., including the operating system of the computer 244, the kernel 245, the SRM 246, one or more SPP programs 247, and the TCB data 248, plus other application programs, program modules, and program data 249 that may include one or more SPP programs 247 can either be the same as or different from the operating system of the computer 234, including the kernel 235, the SRM 236, one or more SPP programs 237, and the TCB data 238, plus application programs, other program modules, and program data 239 that may include one or more SPP programs 237a in the RAM 232. As will be appreciated by those skilled in the art, application programs, other program modules, and program data stored in RAM is transitory and used for quick and immediate access. The information stored on a hard disk drive, on the other hand, is long term and permanent. In operation, the RAM makes a copy of the application programs, other program modules, or program data from the hard disk drive as required. Storing a copy in RAM increases the access speed of the application programs, other program modules, and program data, which is a sought after feature in today's computing environment.

A computer device user may enter commands and information into the computer 210 through input devices, such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, a game port, or a universal serial bus (USB). A monitor 291 or other type of display device is also connected to the system bus 221 via an interface, such as a video interface 290.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN network environment, the computer 210 is connected to the LAN 271 through a network interface adapter 272. When used in a WAN network environment, the computer typically includes a modem 274 or other means for establishing communications over the WAN 273, such as the Internet. The modem, which may be internal or external, may be connected to the system bus 221 via the serial port interface or other appropriate mechanism. In a networked environment, program modules depicted relative to the computer 210 or portions thereof, may be stored in the remote memory storage device. By way of example, and not limitation, FIG. 2 illustrates remote application programs 281 as residing on memory device 282. It will be appreciated that the network connections shown are exemplary and other means of establishing communication between the computers may be used. Although many other internal components of the computer 210 are not shown, those of ordinary skill will appreciate that such components and their interconnection are well known. Accordingly, additional details concerning the internal construction of the computer 210 need not be disclosed in connection with the disclosed subject matter.

As will be better understood from the following description, the SRM 236 or 246 uses SPP programs 237 or 247 to facilitate the enforcement of the integrity and/or privacy policy of the computer 210. An SPP program is assigned to label (with an integrity and/or privacy label) each program executing or object running on the computer 210. The SPP program is assigned an integrity and/or privacy label based on certain criteria of the program or object that the SPP program is assigned to monitor. One criterion, especially for a program downloaded from the Internet, is the code origin of the program. For example, if the program downloaded from the Internet originates from a company reputed for producing "safe" programs, and can be verified as such, for example by checking digital signatures of the program, the SPP program may assign an integrity label to the program that allows the program write access certain user data and a privacy label that allows the program read access to certain user data. On the other hand, if the program is known to be spyware, by checking a cyclic redundancy check (CRC) or hash across the program binary, the SPP program may assign a low integrity and/or privacy label to the program. The SRM will then not allow the program to modify user data at a higher integrity label or to read user data at a higher privacy label. While various integrity and/or privacy label indications can be used, preferably, the integrity and/or privacy labels are positive integers of the type employed in the Windows operating system. The integrity and/or privacy label of the downloaded program is less than the integrity and/or privacy label assigned to the SPP program. The assigned integrity and/or privacy label of the downloaded program hence prevents the downloaded program from being able to access any data with an integrity and/or privacy label above the level of integrity and/or privacy established by the SPP program or modifying the data of the SPP program.

Figure 3:
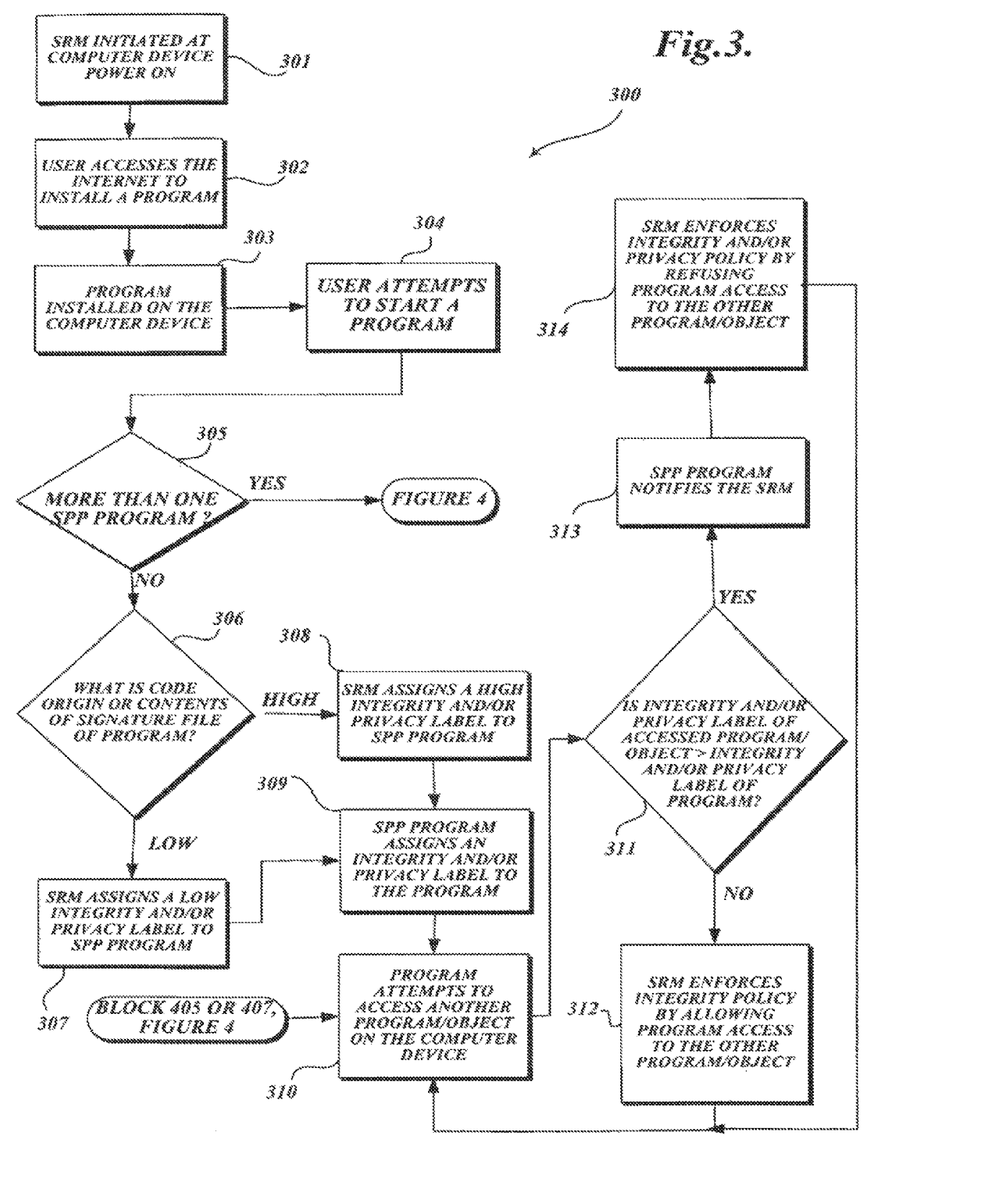
FIG. 3 is a functional flowchart illustrating exemplary actions that occur when a computer device user downloads a process to install a program, according to one embodiment of the disclosed subject matter.

FIG. 3 is a functional flowchart illustrating exemplary actions 300 that occur when a computer device user downloads a process to install a program. At block 301, on computer device power on, the SRM is initiated with enforcing policy on all programs executing and objects running on the computer device. At block 302, a computer device user accesses the Internet to install a program to the computer device. At block 303, the program is installed on the computer device. At block 304, the computer device user attempts to start a program. The program that the user is attempting to start could be the newly installed program or a program previously installed on the computer device. At block 305, the SRM or some other TCB component checks to see if one or more SPP programs are assigned to monitor the program. If there is more than one SPP program, the flowchart continues to FIG. 4 (the arrow marked "YES" from block 305).

Figure 4:
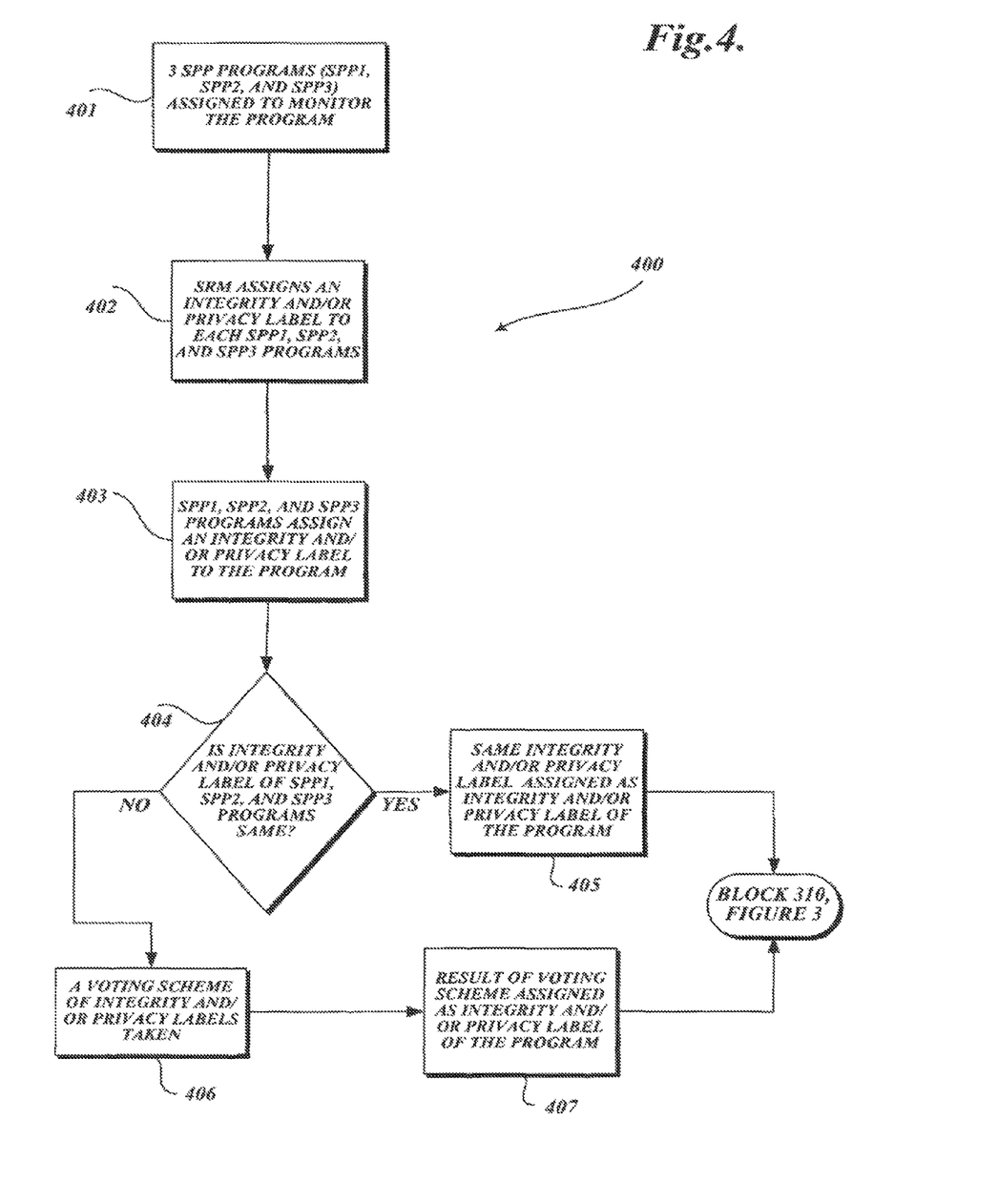
FIG. 4 is a functional flowchart illustrating exemplary actions that occur when a plurality of SPP programs assign an integrity and/or privacy label to a program, according to one embodiment of the disclosed subject matter.

FIG. 4 is a functional flowchart illustrating exemplary actions 400 that occur according to one embodiment when there are more than one SPP programs assigned to monitor the program. As mentioned above, more than one SPP programs are assigned to monitor the downloaded program if there is more than one criterion of the program to choose the integrity and/or privacy label of the program. For example, one criterion could be based on the code origin of the program. Another criterion could be based on the contents of a signature file of the program. Yet another criterion could be based on a global user preference. The above-mentioned criteria and the number of criteria should be both taken as exemplary and not as limiting to the scope of the disclosed subject matter. At block 401, three SPP programs (SPP1, SPP2, and SPP3) are assigned by the SRM to monitor the program based on the exemplary three criteria mentioned above. At block 402, an integrity and/or privacy label is assigned by the computer device security policy within the SRM to each of the three SPP programs. At block 403, each of the three SPP programs assign an integrity and/or privacy label to the program. As mentioned above, the integrity and/or privacy label is a positive integer. Also as mentioned above, the integrity and/or privacy label of the program is less than or equal to the integrity and/or privacy label assigned to the SPP program (by the SRM) that is assigning the integrity and/or privacy label to the program.

Returning to FIG. 4, at block 404, a test is made to determine if the integrity and/or privacy label assigned to the program by each of the three SPP programs is the same. If the integrity and/or privacy label assigned by each of the three SPP programs is the same (the "YES" branch from block 404), at block 405 the commonly assigned integrity and/or privacy label is assigned as the integrity and/or privacy label of the program. If, on the other hand, the integrity and/or privacy label assigned by each of the three SPP programs is not the same (the "NO" branch from block 404), at block 406 a voting scheme is used to determine the integrity and/or privacy label to be assigned to the program. For example, the lowest integrity and/or privacy label obtained from the voting scheme, or the integrity and/or privacy label obtained from an average of the integrity and/or privacy labels of the voting SPP programs could be used as the integrity and/or privacy label of the program. It is to be understood that the disclosed subject matter is not limiting to a particular voting scheme used to determine the integrity and/or privacy label of the program. Returning to FIG. 4, at block 407, the integrity and/or privacy label determined by the voting scheme is assigned to the program. Whether the program is assigned the commonly assigned integrity and/or privacy label at block 405 or the integrity and/or privacy label based on the result of the voting scheme at block 407, the flowchart continues at block 309 in FIG. 3.

The higher the integrity and/or privacy label of a program and/or object, the greater the amount of private and/or secure data that the program and/or object can access. As mentioned above, then SPP program can only assign an integrity and/or privacy label to the program and/or object the SPP program is assigned to monitor whose value is less than or equal to the integrity and/or privacy label of the assigning SPP program. If, for example, the SPP program is assigned an integrity label 5 and a privacy label 8 by the computer device security policy within the SRM, the SPP program can only assign a maximum integrity label 5 and privacy label 8 to the program and/or object the SPP program is assigned to monitor. Having the SPP program assign an integrity and/or privacy label to the program and/or object that the SPP program is assigned to monitor that is less than the SPP program's own integrity and/or privacy label ensures that the program cannot modify SPP data for its own purposes. According to one embodiment, once the SPP program assigns an integrity and/or privacy label to the program and/or object the SPP program is assigned to monitor, the integrity and/or privacy label cannot be altered (increased or decreased) unless the program and/or object is altered and the alteration to the program and/or object requires an adjustment to the integrity and/or privacy label.

Returning to FIG. 3, if only one SPP program is assigned to monitor the program (the "NO" branch from block 305), the flowchart continues at block 306. At block 306, a test is made to determine the integrity and/or privacy label of the SPP program assigned to monitor the program. In the example illustrated in FIG. 3, the code origin or contents of a signature file of the program, or other similar criteria, are checked. If the check or checks confirm that the code origin of the newly installed program originates from a manufacturer known to produce malicious programs and/or the contents of the signature file points to a manufacturer known to produce malicious programs, at block 307 (the arrow marked "LOW" from block 306) the SRM assigns a low integrity and/or privacy label to the SPP program assigned to monitor the program. If at block 306 the code origin of the program originates from a manufacturer known to produce safe programs or the contents of the signature file points to a manufacturer known to produce safe programs, at block 308 (the arrow marked "HIGH" from block 306) the SRM assigns a high integrity and/or privacy label to the SPP program assigned to monitor the program. At block 309, the SPP program assigns an integrity and/or privacy label to the program based on the SPP program's integrity and/or privacy label (a low integrity and/or privacy label if the SPP program's integrity and/or privacy label is low (block 307), or a high integrity and/or privacy label if the SPP program's integrity and/or privacy label is high (block 308)).

As mentioned above, the SPP program uses TCB data to assign an integrity and/or privacy label to the program. The TCB data may include, for example, an integrity and/or privacy policy associated with the digital signer of the program. In this example, the integrity and/or privacy policy determines the integrity and/or privacy label assigned to programs and objects associated with the digital signer. Privacy labels are used to protect programs (or threads of execution) and objects with a higher privacy label from un-authorized modification by programs with a lower privacy label. Similarly, integrity labels are used to protect programs (or threads of execution) and objects with a higher integrity label from un-authorized disclosure by programs with a lower integrity label. In this regard, a specified digital signature controls the level of integrity and/or privacy of data allowed to be accessed by other programs. Another example of the use of TCB data to assign an integrity and/or privacy label to a program is the TCB data including a listing of "known good" or "known bad" programs based on, for example, Windows Defender or other commercially available third party SPTs. If the program (either the newly installed or previously installed program) is a known bad program, such as an MSV program, the program will be assigned a very low integrity and/or privacy label. A very low integrity and/or privacy label prevents the program from accessing any data or other programs that can be used to destabilize the integrity and/or privacy of data and programs with higher integrity and/or privacy labels.

Whether the integrity and/or privacy label of the program is the commonly assigned integrity and/or privacy label (block 405 in FIG. 4), the result of the voting scheme (block 407 in FIG. 4), or the low or high integrity and/or privacy label (block 309 in FIG. 3), the flowchart continues to block 310. At block 310 the program attempts to access another program and/or object on the computer device. At block 311, at test is made to determine if the integrity and/or privacy label of the program and/or object being accessed is higher than the integrity and/or privacy label of the program. If the integrity and/or privacy label of the program and/or object being accessed is lower than or equal to the integrity and/or privacy label of the program (the arrow marked "NO" from block 311), at block 312 the SRM enforces the integrity and/or privacy policy of the computer device by allowing the program access to the program and/or object being accessed, and the flowchart returns to block 310. If, on the other hand, the integrity and/or privacy label of the program is less than the integrity and/or privacy label of the program and/or object being accessed (the arrow marked "YES" from block 310), at block 313 the SPP program notifies the SRM. At block 314, the SRM enforces the computer device integrity and/or privacy policy, based on the notification supplied by the SPP program, by refusing the program access to the program and/or object being accessed, and the flowchart returns to block 310.

Preferably, the integrity and/or privacy label of the SPP program and the corresponding integrity and/or privacy label of the program or object monitored by the SPP program are maintained in a table located in a secure section of the operating system. Preferably, the secure section also holds the TCB data. Table 1 below illustrates exemplary integrity and/or privacy labels of SPP programs and the corresponding integrity and/or privacy labels assigned by the SPP programs to a program executing and/or object running on the computer device.

TABLE 1

| Type | Integrity/Privacy label |
|---|---|
| $SPP_1$ | 5/4 |
| $Program_1$ | 5/3 |
| $SPP_2$ | 5/8 |
| $object_2$ | 3/2 |

In the table above, the sub script of a program or object corresponds to the sub script of the SPP program assigned to monitor the program or object. As mentioned above, the SPP program assigns a positive integer value (integrity and/or privacy label) to the program or object assigned to the SPP program by the SRM. As also mentioned above, the integrity and/or privacy label of a program or object cannot be higher than the integrity and/or privacy label of the assigning SPP program. Further, the integrity and/or privacy label of a program or object cannot be altered once the integrity and/or privacy label is assigned by the SPP program unless the program or object is altered and the alteration requires the integrity and/or privacy label to be either increased or decreased.

While the above description of the disclosed subject matter has been described with reference to the computer device security policy within the SRM assigning an integrity and/or privacy label to SPP programs, the disclosed subject matter is not limited to a computer security policy within a specific SRM assigning an integrity and/or privacy label to specific SPP programs. For example, the SRM can be any functionally similar monitor and the SPP program can be any functionally similar monitoring program such that the monitor forms a part of the operating system and is capable of assigning monitoring programs to monitor the activities of all programs executing and objects running on the computer device. The monitor is also capable of receiving from the monitoring programs policy decisions associated with the program or object assigned to each monitoring program. Finally, the monitor is capable of enforcing the integrity and/or privacy policy of the computer device based on the policy decisions supplied by the monitoring programs.

While illustrative embodiments have been illustrated and described, it will be appreciated that various changes can be made therein without departing from the spirit and scope of the disclosed subject matter. Thus, while preferred embodiments of methods for using integrity and/or privacy policies to improve the integrity and/or privacy of the computer device are described herein, it is to be understood that the embodiments of the disclosed subject matter are not limited to the described methods but rather by the following claims and their full scope of equivalents.

The embodiments of the disclosed subject matter in which an exclusive property or privilege is claimed are defined as follows:

1. A method comprising:
assigning to a program an integrity label that allows the program to write to first data, wherein the privacy label is based on a first characteristic of the program;
assigning to the program a privacy label that allows the program to read from second data, wherein the privacy label is based on a second characteristic of the program, where the assignings are performed by a security program that comprises another privacy label and another integrity label, and where the security program is restricted from assigning privacy labels or integrity labels of a value greater than the another privacy label and the another integrity label respectively; and
determining, by a computer in response to the program seeking to write to the first data, whether to grant or deny the seeking to write the first data based on the integrity label relative to a label associated with the first data, or
determining, by the computer in response to the program seeking to read from the second data, whether to grant or deny the seeking to read from the second data based on the privacy label relative to a label associated with the second data.

2. The method of claim 1 wherein the integrity label or the privacy label is implemented as a positive integer.

3. The method of claim 2 wherein, in response to the first data being associated with another integrity label that is greater than the integrity label, the determining whether to grant or deny the seeking to write the first data results in denying the seeking to write.

4. The method of claim 2 wherein, in response to the second data being associated with another privacy label that is greater than the privacy label, the determining whether to grant or deny the seeking to read the second data results in denying the seeking to read.

5. The method of claim 1 wherein the program was installed from a public network.

6. The method of claim 1 wherein the program is restricted from modifying another program and its data that has an integrity label that is of a value greater than that of the program's integrity label.

7. The method of claim 1 wherein the program is restricted from accessing another program and its data that has a privacy label that is of a value greater than that of the program's privacy label.

8. A system comprising:
- a computing device configured for assigning to a program an integrity label that allows the program to write to first data, wherein the privacy label is based on a first characteristic of the program;
- the computing device further configured for assigning by the computer to the program a privacy label that allows the program to read from second data, wherein the privacy label is based on a second characteristic of the program, where the assignings are performed by a security program that comprises another privacy label and another integrity label, and where the security program is restricted from assigning privacy labels or integrity labels of a value greater than the another privacy label and the another integrity label respectively;
- the computing device further configured for determining, in response to the program seeking to write to the first data, whether to grant or deny the seeking to write the first data based on the integrity label relative to a label associated with the first data; and
- the computing device further configured for determining, in response to the program seeking to read from the second data, whether to grant or deny the seeking to read from the second data based on the privacy label relative to a label associated with the second data.

9. The system of claim 8 wherein the integrity label or the privacy label is implemented as a positive integer.

10. The system of claim 9 wherein, in response to the first data being associated with another integrity label that is greater than the integrity label, the determining whether to grant or deny the seeking to write the first data results in denying the seeking to write.

11. The system of claim 9 wherein, in response to the second data being associated with another privacy label that is greater than the privacy label, the determining whether to grant or deny the seeking to read the second data results in denying the seeking to read.

12. The system of claim 8 wherein the program was installed from a public network.

13. The system of claim 8 wherein the program is restricted from modifying another program and its data that has an integrity label that is of a value greater than that of the program's integrity label.

14. The system of claim 8 wherein the program is restricted from accessing another program and its data that has a privacy label that is of a value greater than that of the program's privacy label.

15. At least one computer storage media storing computer-executable instructions that, when executed by a computing device, cause the computing device to perform a method comprising:
- assigning by a computer to a program an integrity label that allows the program to write to first data, wherein the privacy label is based on a first characteristic of the program;
- assigning by the computer to the program a privacy label that allows the program to read from second data, wherein the privacy label is based on a second characteristic of the program, where the assignings are performed by a security program that comprises another privacy label and another integrity label, and where the security program is restricted from assigning privacy labels or integrity labels of a value greater than the another privacy label and the another integrity label respectively;
- determining, in response to the program seeking to write to the first data, whether to grant or deny the seeking to write the first data based on the integrity label relative to a label associated with the first data; and
- determining, in response to the program seeking to read from the second data, whether to grant or deny the seeking to read from the second data based on the privacy label relative to a label associated with the second data.

16. The at least one computer storage media of claim 15 wherein the integrity label or the privacy label is implemented as a positive integer.

17. The at least one computer storage media of claim 16 wherein, in response to the first data being associated with another integrity label that is greater than the integrity label, the determining whether to grant or deny the seeking to write the first data results in denying the seeking to write.

18. The at least one computer storage media of claim 16 wherein, in response to the second data being associated with another privacy label that is greater than the privacy label, the determining whether to grant or deny the seeking to read the second data results in denying the seeking to read.

19. The at least one computer storage media of claim 15 wherein the program was installed from a public network.

20. The at least one computer storage media of claim 15 wherein the program is restricted from modifying another program and its data that has an integrity label that is of a value greater than that of the program's integrity label, or wherein the program is restricted from accessing another program and its data that has a privacy label that is of a value greater than that of the program's privacy label.

* * * * *